United States Patent [19]
Humphrey

[11] 3,941,451
[45] Mar. 2, 1976

[54] INLINE OPTICAL WEDGE STABILIZER

[75] Inventor: William Edwin Humphrey, Oakland, Calif.

[73] Assignee: Optical Research and Development Corporation, Berkeley, Calif.

[22] Filed: Mar. 11, 1974

[21] Appl. No.: 449,869

[52] U.S. Cl. .................................. 350/16; 350/287
[51] Int. Cl.² ...................... G02B 23/02; G02B 5/06
[58] Field of Search ...................... 350/16, 286, 287

[56] References Cited
UNITED STATES PATENTS

| | | | |
|---|---|---|---|
| 3,503,663 | 3/1970 | De La Cierva et al. | 350/16 |
| 3,655,274 | 4/1972 | Craig | 350/16 X |

Primary Examiner—David H. Rubin
Attorney, Agent, or Firm—Townsend and Townsend

[57] ABSTRACT

A stabilizer is disclosed which can alone, or in combination with other optics of known magnification, produce stabilized images where ambient instrument vibration occurs. An optically transparent liquid of known index of refraction is confined to a chamber having at least one freely movable transparent wall. A light path is defined into or out of the chamber substantially normal to the neutral position of the freely movable transparent wall. When the chamber is subjected to accidental angular motion, the fluid within the chamber inertially acts upon the freely movable transparent wall to move the wall and thereby create a transparent fluid wedge. This transparent fluid wedge, either alone or in conjunction with other optics of known magnification, produces apparent image movement equal and opposite to the image movement produced by ambient accidental vibration. Optical stabilization results. Provision is made in an improved bellows for support of the freely movable transparent wall with respect to the chamber.

6 Claims, 6 Drawing Figures

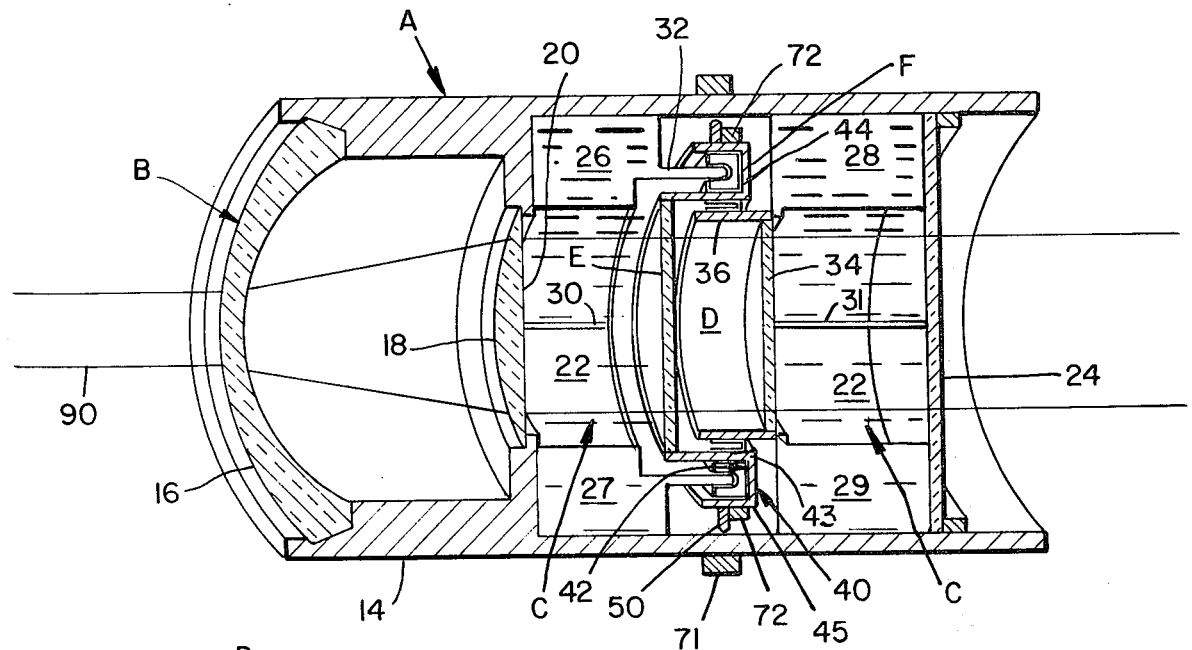
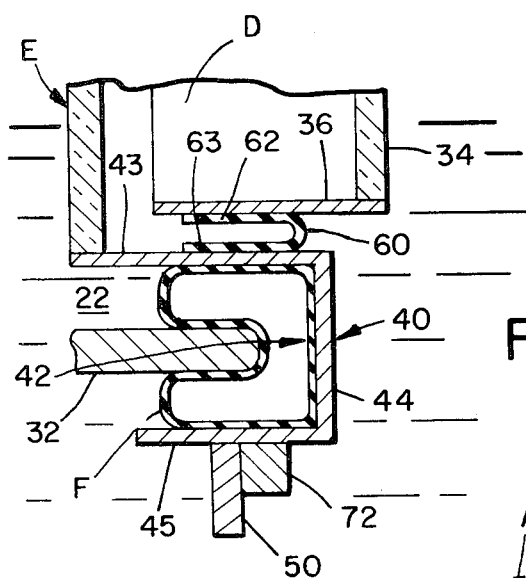
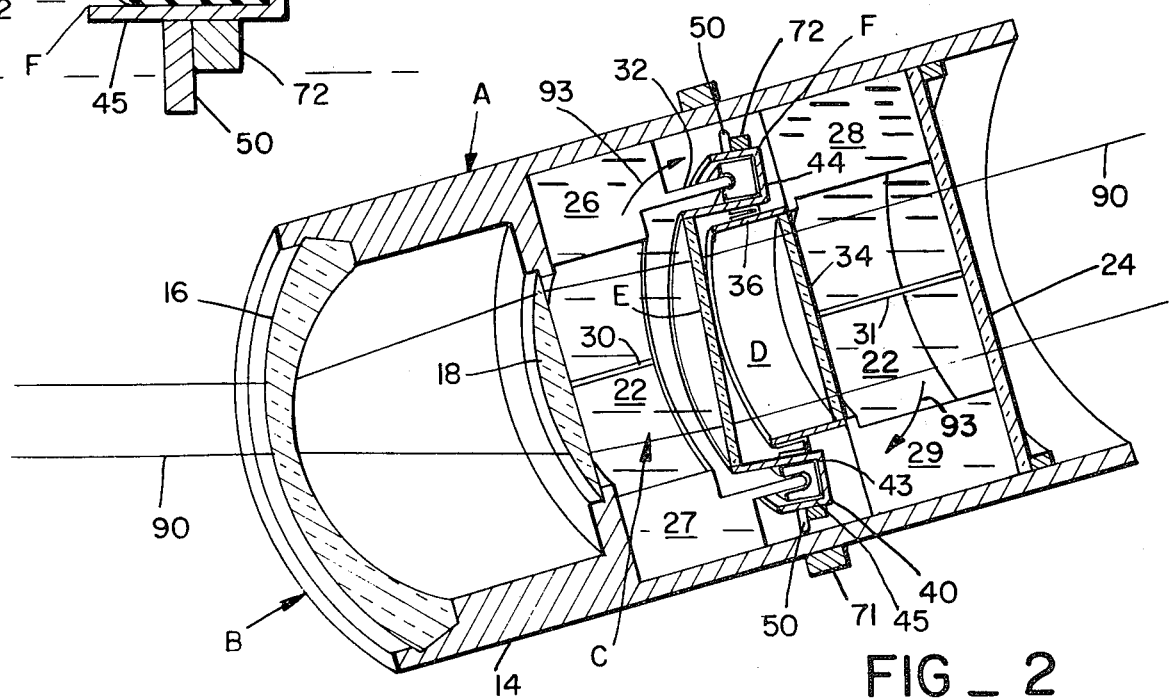

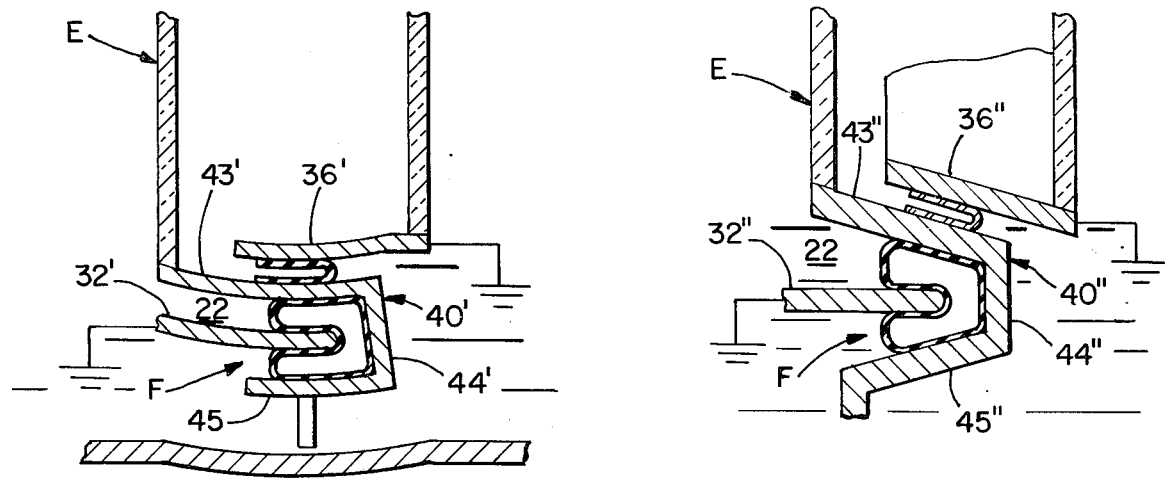
FIG _ 3a
FIG _ 3b
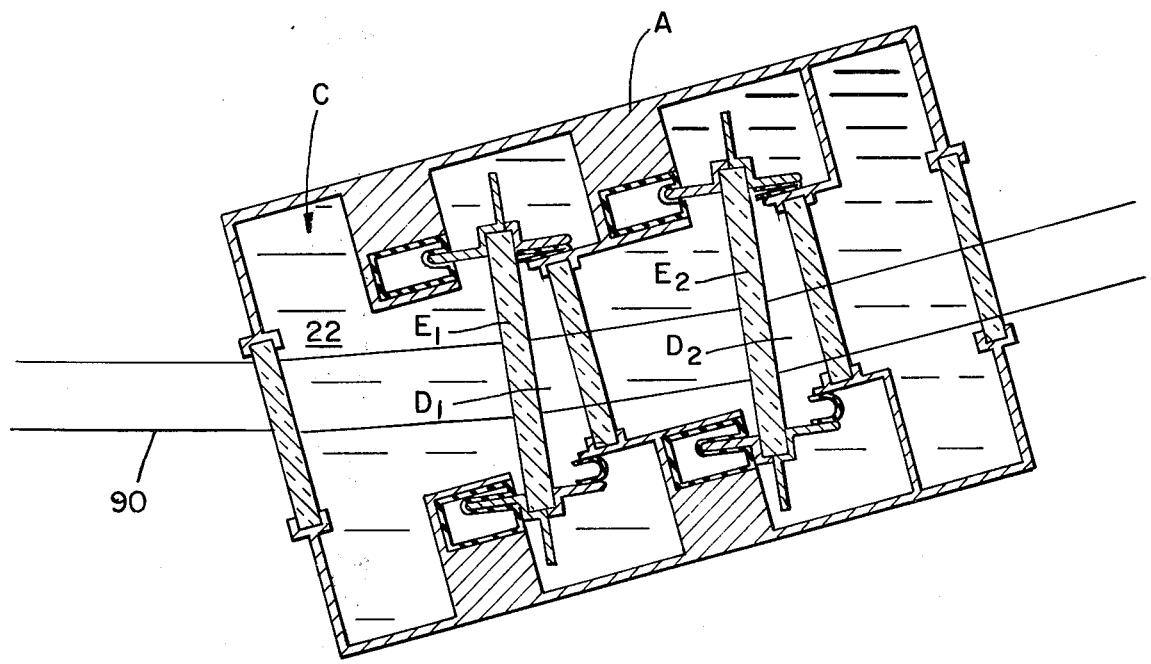
FIG _ 4

INLINE OPTICAL WEDGE STABILIZER

This invention relates to optical stabilizers and typically utilizes a transparent fluid air interface to produce a fluid wedge from which stabilization can occur.

SUMMARY OF THE PRIOR ART

Two types of optical instruments for optically deflecting and thereby stabilizing are of relevance to this invention. First, fluid chambers having a fluid air interface capable of deflecting light have had the shape of the chamber changed by exterior motor forces supplied by gyroscopes and the like. These apparatus with their relatively bulky motor controls or the like are relatively heavy and correspondently complicated in their production.

Another form of stabilizing device is a constant shaped fluid chamber having at least one transparent wall with an optically moving element contained within the chamber. Dependent upon the inertial forces of the optically transparent fluid contained within the chamber, movement of the optical element with resultant deflection occurs.

This constant shaped fluid chamber stabilizer, however, is not as useful where a low power or wide field of view is desired in the optical instrument. Especially in the case of reflective elements within a constant shaped fluid chamber, the returned beam either interferes with the incoming beam or is distorted unsatisfactorily in a large angular deflection (typicallly in the order of 35° to 40°) destroying or deteriorating stabilization in some directions.

SUMMARY OF THE INVENTION

An optically transparent liquid of known index of refraction is confined to a chamber having at least one freely movable transparent wall. The chamber is arranged so that a light path enters the chamber substantially normal to the neutral position of the freely movable transparent wall. When the chamber is subjected to accidental angular motion, the fluid within the chamber inertially acts upon the freely movable transparent wall to move the freely movable transparent wall from its neutral position and to create a transparent fluid wedge. This transparent fluid wedge, either alone or in conjunction with other optics of known magnification, produces apparent image movement equal and opposite to the image movement produced by accidental angular vibration. Optical stabilization results.

Provision is made in an improved toroid shaped bellows for an improved support of the movable transparent wall. Typically, the toroid shaped bellows is captured within an annular concavity fixed either to the chamber or the moving transparent wall. The moving transparent wall or chamber is biased against the toroid shaped bellows as it is held within the annular concavity. Predictable movement of the transparent wall with respect to the remainder of the chamber when acted upon by the inertial fluid forces interior of the chamber results.

FURTHER OBJECTS AND ADVANTAGES OF THIS INVENTION

An object of this invention is to create a stabilizer which can, in the absence of any magnification, optically deflect light to effect stabilization. Preconditioning or postconditioning optics are not required.

According to one aspect of this invention, a transparent fluid having an index of refraction in the range of 2 can be utilized to effect stabilization. According to another aspect of this invention, a series of more than one movable transparent walls and resultant optic wedges can be used to generate stabilizing output.

An advantage of the unity power stabilization construction of this invention is that the stabilizer can be used as the lead element in an optical system. Degradation of image clarity, associated with the use of either protective covers or preconditioning optics, can be avoided in the entirety.

A further advantage of the unity power stabilizer of this invention is that it is adaptable for use with zoom optics. By the expedient of placing the stabilizer in front of the remainder of optics of the invention, stabilization on a unity basis can first occur. Thereafter, alternation of the power of magnification of the instrument can take place.

A further object of this invention is to create a stabilizer with a degree of stabilization that is effectively less than 100 percent. According to this aspect of the invention, either the movable transparent wall can be provided with limited response to overall instrument movement, or alternately a low index transparent fluid can be provided, or both a transparent wall with limited movement and a low index transparent fluid can be utilized together.

An advantage of the less than unity power stabilization is that the stabilizer is readily adaptable to wide angle stabilization. A further advantage of using a fluid having a low index of refraction is that more uniform refraction of a wide spectra of light is possible.

A further object of this invention is to disclose an improved bellows support for mounting a transparent wall to other chamber segments of constant dimension. A bellows, in the form of a toroid, is captured interior of an annular concavity attached to either the movable transparent wall or constant shaped chamber, respectively. The constant shaped chamber or movable transparent wall, respectively, is biased against the toroid shaped diaphragm as it is captured interior of the diaphragm. Free movement of the transparent wall with respect to the chamber responsive to inertial movement of the transparent fluid within the chamber occurs.

An advantage of the toroid shaped bellows captured within the annular concavity is that construction of the bellows can be made so that substantially no restoring force associated with movement of the transparent wall with respect to the constant shaped chamber occurs.

A further advantage of this invention is that the bellows can be altered to produce a bias on the transparent wall with respect to the constant shaped chamber to produce adjustable movement of the transparent wall to and from a neutral position.

Yet another advantage of the toroid shaped bellows of this invention is that the effect of the elasticity effects of the material from which the bellows is constructed can be reduced to a negligible amount. The elastic effect of the material can be neutralized with respect to transparent wall movement.

A further advantage of the bellows construction of this invention is that the effect of gravity bias on the transparent wall can be eliminated. By the expedient of constructing the surface of the bellows and the surface of the transparent wall on a buoyantly integrated moment basis, balancing of the gravitational effect and buoyant effect in all attitudes of the stabilizer can be achieved. Changed disposition of the instrument with relation to gravity forces will not produce changed bias on the freely movable transparent wall.

Yet a further advantage of this invention is that the toroid shaped bellows used in this invention can additionally serve as an expansion chamber. For varying atmospheric operating temperatures and pressures, the chamber can act to variably absorb at least some of the changes in liquid and air volumes to produce predictable instrument movement over wide instrument ambient operating conditions.

Other objects, features and advantages of this invention will become apparent after referring to the following specification and attached drawings in which:

FIG. 1a is a perspective side elevation section of a stabilizer according to this invention, the stabilizer having wide angle preconditioning optics;

FIG. 1b is an enlargement of the bellows system utilized with this invention;

FIG. 2 is a perspective side elevation of the apparatus shown in FIG. 1a after undergoing accidental angular motion, the motion here being shown exaggerated;

FIG. 3a is an alternate embodiment of the bellows construction shown in FIG. 1b;

FIG. 3b is an alternate embodiment of the bellows construction shown in FIG. 1b; and, FIG. 4 is a side elevation section in perspective of an alternate embodiment of this invention having two successive variable wedge stabilizer devices, the device here shown after undergoing accidental angular motion.

Referring to FIG. 1a, a stabilizer cell in accordance with this invention is illustrated. Housing A includes a Galilean wide angle preconditioning optics B. A fluid chamber C is illustrated having an interior air chamber D. A freely movable transparent wall E supported in such free movement by bellows F is shown defining a movable transparent side wall of air chamber D. As shown in FIG. 2, accidental angular movement of housing A moves transparent wall E. This movement of transparent wall E creates an inclined refractive interface which causes the deflection of light.

Housing A typically comprises cylinder 14. Cylinder 14 houses, at its forward end, Galilean preconditioning optics including a negative meniscus lens 16 and a convex lens 18 having a magnification of less than 1. The rear side 20 of convex lens 18 forms, in conjunction with housing 14, a fluid-tight transparent wall for the transparent fluid 22 interior of fluid chamber C. Housing 14 had additionally attached to it a transparent wall 24. Transparent wall 24 forms the rear fluid-tight transparent wall of chamber C. Rear side 20 of convex lens 18 is here shown flat; moderate curvature may or may not prove desirable in a detailed optical design.

Thus, there is defined a fluid-tight volume C interior of housing A.

Regarding fluid 22, it is required that this fluid be transparent. Fluids with various indices of refraction can be used in this instrument, provided that the fluid has a different index of refraction than the different fluid (typically ambient atmosphere) of air chamber D. It should be noted that most practical fluids have an index of refraction of less than 2. Examples of such fluids which can be successfully combined with a standard atmosphere of air can be found in *The Practical Use of the Microscope Including Photomicrography* by George Herbert Needham, published by Charles C. Thomas, Springfield, Illinois at pages 201–203.

When housing A undergoes accidental angular motion, the inertial movement of the captured fluid 22 from the walls of chamber C reacts on the movable wall E to cause deflection of the movable wall. Movement of the fluid in fluid paths around air chamber D and in planes parallel to the axis of cylindrical housing A is desired. Movement of the fluid to rotate about the axis of the cylindrical chamber A is not desired.

To this end, there is affixed interior of the chamber C a series of vanes, vanes 26 through 31, being visible in the perspective sections here shown. These vanes are all disposed with their planar surfaces parallel to the axis of cylindrical chamber A. These vanes 26–31 permit circular movement of the fluid around air chamber D to occur but inhibit rotational movement of fluid 22 about the optic axis without corresponding rotational movement of the chamber A.

Mounting of the transparent wall E with respect to air chamber D and fluid chamber C can best be understood with simultaneous reference to FIGS. 1a and 1b. Fins 26, 27 and 30 support, at their end adjacent chamber D, rim 32. As can be seen, rim 32 is rigidly attached to chamber A and moves with chamber A.

Fins 28, 29 and 31 support a transparent wall 34. Wall 34 has attached to it a rim 36. Rim 36 is smaller in diameter than rim 32, and like rim 32 is rigidly affixed to and moves with chamber A.

Transparent window E is mounted to a circular rim 40 defining an annular concavity 42. In section, the annular concavity of rim 40 is U-shaped, having rim-shaped walls 43 and 45 forming the sides of the U with rim- or washer-shaped wall 44 joining the sides of the U.

It will be noted that wall 45 forms a rim circularly of the chamber D having a diameter greater than rim 32. Similarly, it will be noted that wall 43 forms a rim circularly of the chamber D. This rim has a diameter greater than rim 36 affixed to chamber A. Additionally, wall 43, in forming its rim, has a diameter less than rim 32 affixed to chamber A.

Finally, the rim 40 defining the annular concavity includes a radially extending fluid coupling baffle 50. Fluid coupling baffle 50, together with movable transparent wall E and the bellows assembly F, causes movement responsive to inertial movement of the fluid 22 interior of the chamber C.

Having set forth in some detail the construction of the chamber of fixed rims 32 and 36 and the transparent wall rim 40 defining a concavity, attention may now be directed to the bellows members of this invention.

A first flexible rim-shaped bellows 60 is typically affixed to the outside diameter of rim 36 in the vicinity of 62. Bellows 60 defines the boundary between air chamber D and the fluid 22 surrounding the chamber. This bellows 60, at the opposite end of its rim, is affixed to the outside diameter of wall 43 at 63. Bellows 60, in attachment to the outside diameter of wall 43 at 63, is folded back upon itself to give the U-shaped configuration shown in FIG. 1b.

Stopping at this juncture, it will be seen that bellows 60, as circumferentially attached to the outside of transparent wall E and as circumferentially attached to the inside of annular concavity defined by walls 36, thus isolates air chamber D from the fluid 22 interior of fluid chamber C. Thus, even though relative movement were to occur between wall E and chamber C, an airtight fluid volume would be defined interior of the air chamber D. This airtight fluid chamber D would remain respective of whether transparent wall E moved in one direction or another direction.

It is emphasized that the preferred configuration of the bellows 60 are disposed in a U-configuration with fastening occurring at the upper ends of the U. This disposition of the bellows has minimal restoring force with regard to the material from which the bellows is constructed. Thus, movement of the transparent wall E will be substantially free and unrestricted without regard to any residual elastic property of the membrane 60.

Understanding that bellows 60 as affixed to chamber D will define a fluid-tight wall, and ignoring for the present the torus shaped bellows F, it is useful to discuss the statics of the buoyant forces present on the movable wall E as defined by this invention. Broadly, the hydrostatic head of the fluid 22 interior of the chamber C will increase from a minimum pressure at the top of transparent wall E to a maximum pressure at the bottom of transparent wall E. This increase in pressure from a minimum to a maximum will tend to bias transparent wall D counterclockwise from the disposition shown in FIGS. 1a and 1b. It is this bias which it is the function of torus shaped bellows F to avoid.

Torus or toroid shaped bellows F are placed and preferably fastened interior of the concavity defined by the annular rim 40. This torus shaped bellows F opens to fluid 22 in the same direction as transparent window E. Typically, the medial portion of the torus shaped bellows F is impinged upon by the blunt end of ring 32.

Ignoring air chamber D, it will be seen that the effect of the fluid pressure acting on annular concavity 40 is the opposite. Bellows F will tend to rotate transparent wall E in a clockwise direction through action of the differential pressure.

By integrating the pressure gradients on the movable transparent wall E on one hand, and the torus shaped bellows F on the other hand, with respect to the mean hydrostatic pressure of the fluid 22, a bellows system can be constructed wherein transparent wall E does not move responsive to the differential of hydrostatic pressure within the chamber C.

Both bellows 60 and torus or toroid shaped bellows F are typically formed from neoprene impregnated fabric. Such fabric may be obtained under the product name of Bellofram Rolling Diaphragm, a product line of the Bellofram Corporation of Burlington, Massachusetts.

It will be realized that the construction thus far illustrated gives a freely movable transparent wall E interior of the chamber C. This wall E can typically be biased to a neutral position by the insertion of magnetic rings 71, 72.

Having set forth the mechanical construction of this invention illustrated in FIGS. 1a and 1b, attention can now be directed to the operable dynamics of the invention as illustrated in FIG. 2.

Referring to FIG. 2, it will be seen that housing A has suddenly been angularly inclined with respect to its disposition illustrated in FIG. 1a by accidental angular motion. Parallel light rays 90 impinge upon wide angle preconditioning optics B and are transmitted interior of fluid 22. Fluid 22 undergoes inertial motion responsive to the sudden angular motion of the chamber A. Fluid 22, restricted to a circular path about the air chamber D, follows a circular path in the plane of FIG. 2 indicated by arrows 93.

The concave annular ring construction 40, as well as the radial vane 50, move responsive to movement of the fluid 22. Just as the fluid moves along the path 93 responsive to the movement of the chamber A, transparent window E moves responsive to the movement of the chamber E in the clockwise direction as illustrated in FIG. 2. It will readily be appreciated by those having skill in the art that movement of the transparent wall E has created a fluid wedge interior of the chamber C. This fluid wedge causes deflection of light 90 parallel to the cylindrical walls of chamber A. Camera type stabilization results. That is to say, rays 90 exit the stabilizer assembly relative to housing A in the same angular alignment in FIG. 2 as they had in FIG. 1a.

It should be appreciated that for eye stabilized viewing, modification to the light exiting the stabilizer and attached optics should be parallel to the incoming light. Such modifications can be made by those having ordinary skill in the art after referring to my U.S. Pat. Nos. 3,531,176; 3,532,409; 3,620,594 and 3,677,618.

Two observations can be made at this juncture. First, the index of refraction of the fluid 22 relative to the gas, usually ambient air, contained interior of chamber D, will produce the deflection of light desired. Change of index will produce correspondent change of deflection.

Second, the shape of the fluid chamber C, with respect to the movable transparent wall E, will have an effect. Typically, where chamber C is relatively long with respect to its cylindrical diameter, more movement of wall E upon movement of chamber A can be expected. Conversely, where chamber C is relatively short with respect to its cylindrical diameter, less movement of the transparent wall E with respect to chamber A can be expected to occur.

As the parameters of fluid index of refraction and chamber dimension can all be empirically determined by those skilled in the art, they will not herein be set forth.

Referring to the motion of the transparent window E as it defines a boundary to the air chamber D, it will be noted that the borders of transparent window E follow a generally arcuate path when the window is subjected to motion. Referring to FIG. 3a, it can be seen that the respective rims 36', 43', 32' and 45' have all been provided with an arcuate section which defines a portion of a sphere. This arcuate section allows maximum unobstructed movement about the effective center of rotation of the movable transparent wall E with minimum chance of the rims coming into sliding and frictional contact one with another.

Referring to FIG. 3b, an alternate configuration of the bellows wall is illustrated. Walls 43'' and 45'' are each constructed with a V-shaped taper to the section of the walls of FIG. 3b. This taper opens outwardly and towards the direction of the fluid 22 as illustrated in FIGS. 1a and 2. With this construction, increased penetration of the chamber affixed rim 32'' with respect to the V-sectioned annular rim 40'' brings on increased resistance. Conversely, as transparent wall E moves so that rim 32'' moves out of the V-sectioned concavity defined interior of rim 40'', the torques of the bellows tend to restore the neutral position.

The advantage of this arrangement should be readily apparent. No longer are the attractive ring magnets 71 and 72 required to bias the transparent wall E to a neutral position. Rather, the bellows with a controlled spring force, provided by the tapering rims 43″ and 45″, can be relied upon to accomplish this bias function through their variable cross section on torus shaped bellows F.

It will be appreciated that the taper provided by rims 43″ and 45″ could be placed elsewhere. For example, a taper could be provided between rim 43″ and rim 36″ as well, to provide a buoyant fluid bias of movable transparent wall E to a preselected neutral position.

Referring briefly to the example of the stabilizers of FIGS. 1 and 2, it will be realized that in the absence of the preconditioning optics B, the percentage of stabilization will be a function of the movement of the transparent wall E and the index of refraction of the fluid 22. It has been found that fluids having high indices of refraction have a substantially uniform index of refraction for relatively narrow light spectra. That is to say, if light is to be uniformly stabilized by the utilization of a transparent fluid 22 having a high index of refraction, the spectrum of light which can be uniformly stabilized is relatively narrow. The configuration of FIG. 1 using preconditioning optics B allows use of lower index fluids having more desirable color dispersion properties.

Referring to FIG. 4, and assuming that for the reasons just discussed a low index of refraction fluid 22 is to be used with relatively large stabilization deviation occurring, an alternate embodiment of this invention is illustrated. Broadly, two air chambers $D_1$ and $D_2$ having respective movable transparent walls $E_1$ and $E_2$ are illustrated. These chambers and transparent walls are arranged in tandem one behind the other, with the bellows F of construction identical to the construction previously described.

Upon accidental angular deviation, one half the stabilization occurs at the air-fluid wedge created by fluid 22, movable transparent wall $E_1$ and chamber $D_1$. The remaining half of stabilization occurs at the air-fluid wedge created by fluid 22, movable window $E_2$ and air chamber $D_2$.

The tandem arrangement of the chambers $D_1$ and $D_2$ here shown can obviously be expanded. More than two air-fluid interfaces and movable transparent walls can be used in a stabilizer.

It should be understood that this invention, as illustrated, will admit of a number of modifications. For example, lenses can be substituted at all locations where transparent walls are shown. Moreover, gases or fluids other than air can be inserted into the instrument, the only requirement being that a variable index of refraction occur across the interface provided by the freely movable transparent wall. Additionally, various portions of the instrument can be supplied with or communicated to desiccating agents and fluid reservoirs to prevent respective instrument fogging and moisture depletion caused by liquid evaporation or vaporization of any sort. Likewise, other modifications can be made without departing from the spirit and scope of this invention.

I claim:

1. An optical stabilizer comprising: a chamber having at least one rigid transparent wall for admitting light to be stabilized into said chamber and at least one movable transparent wall; means for effecting a fluid-tight seal between said movable transparent wall and said chamber for permitting said chamber in the interior to confine between said transparent walls a transparent fluid of a first index of refraction separate and apart from a transparent fluid on the exterior of said chamber of a second and different index of refraction; a transparent fluid of said first index of refraction confined within said chamber; a fluid of said second and differing index of refraction on the opposite side of said freely movable transparent wall without said chamber; a light path defined through the rigid transparent wall, the first fluid, said freely movable transparent wall and said second transparent fluid; means for defining an enclosed pressure-sensitive diaphragm contacting said chamber at one boundary, contacting said movable transparent wall at another boundary and exposed to said first fluid interior of said chamber, said means for defining a pressure-sensitive diaphragm having an area with respect to the area of said transparent wall whereby differences in pressure of said fluids acting on said movable transparent wall are equally and oppositely opposed by pressures in said diaphragm acting from said chamber to said movable transparent wall to render said movable transparent wall substantial freedom of movement independent of differing incremental static fluid pressures on said movable transparent wall; and means for biasing said movable transparent wall to a neutral position whereby upon accidental angular motion of said chamber the inertia of said fluid within said chamber dynamically acts upon said freely movable transparent wall to move said wall and generate an angularly inclined refractive wedge for the stabilization of light.

2. The optical stabilizer of claim 1 and further including a plurality of freely movable transparent walls, with each transparent wall having a respective means for effecting a fluid-tight seal; means for defining an enclosed pressure-sensitive fluid diaphragm; and, means for biasing said wall to a neutral position.

3. The optical stabilizer of claim 1 further including a transparent fluid of preselected index of refraction in the range of 2.

4. The optical stabilizer of claim 1 and further including wide angle optics in said light path between an object and said freely movable transparent wall.

5. The optical stabilizer of claim 1 and wherein said means for defining an enclosed pressure-sensitive diaphragm includes means for biasing said movable transparent wall to a neutral position by changing the area of said diaphragm exposed to said fluid upon varying movement of said movable transparent wall with respect to said chamber.

6. The optical stabilizer of claim 1 and wherein said means for biasing said movable transparent wall to a neutral position includes magnets attached to said movable transparent wall and magnets attached to said chamber, said respective magnets attracting said movable transparent wall with respect to said chamber to a preselected neutral position.

* * * * *